(No Model.)
3 Sheets—Sheet 1.

D. G. WEEMS.
ORE SEPARATOR.

No. 344,022.
Patented June 22, 1886.

Witnesses.
W. Rossiter
F. Mills.

Inventor.
David G. Weems
By Ruine Fisher
His Attys.

(No Model.) 3 Sheets—Sheet 3.

D. G. WEEMS.
ORE SEPARATOR.

No. 344,022. Patented June 22, 1886.

Witnesses.
W. Rossiter
F. Mills.

Inventor:
David G. Weems
By Fisher
his Attys.

UNITED STATES PATENT OFFICE.

DAVID G. WEEMS, OF BALTIMORE, MARYLAND.

ORE-SEPARATOR.

SPECIFICATION forming part of Letters Patent No. 344,022, dated June 22, 1886.

Application filed October 5, 1885. Serial No. 179,051. (No model.)

*To all whom it may concern:*

Be it known that I, DAVID G. WEEMS, a citizen of the United States, residing at Baltimore, State of Maryland, have invented certain new and useful Improvements in Ore-Separators, of which I do declare the following to be a full, clear, and exact description, reference being had to the accompanying drawings, forming part of this specification.

My present invention has for its object to provide an improved construction of apparatus whereby the separation of black sand and gold from placer earth, the separation of gold from auriferous ground ore, and like metallurgical operations can be more effectively carried on than is possible in the machines heretofore devised for such purposes.

To this end my invention consists in certain novel features of construction hereinafter described, illustrated in the accompanying drawings, and particularly defined in the claims at the end of this specification.

Figure 1:
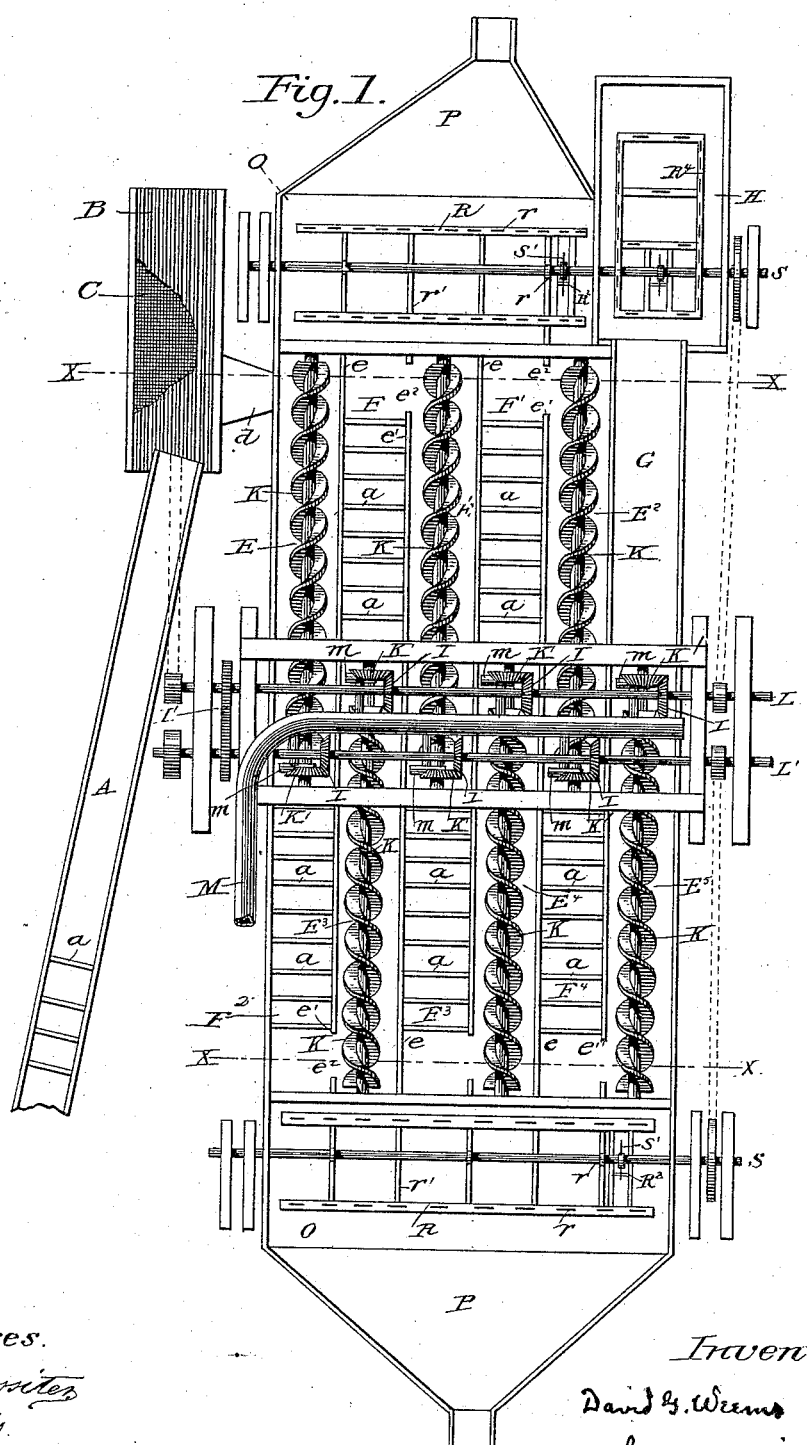
Figure 2:
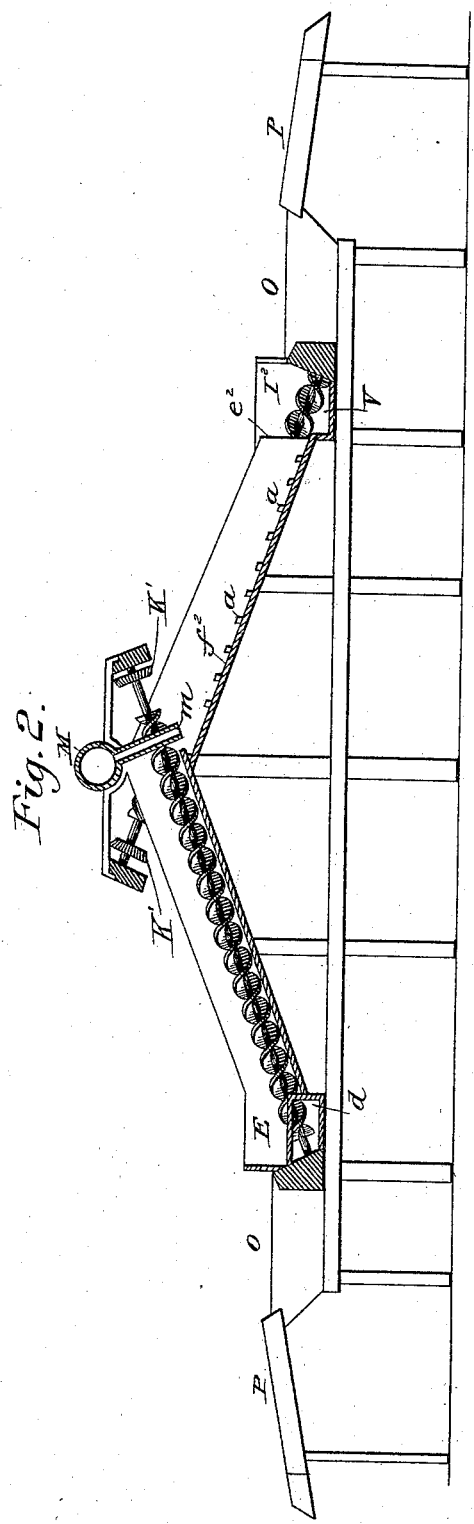
Figure 3:
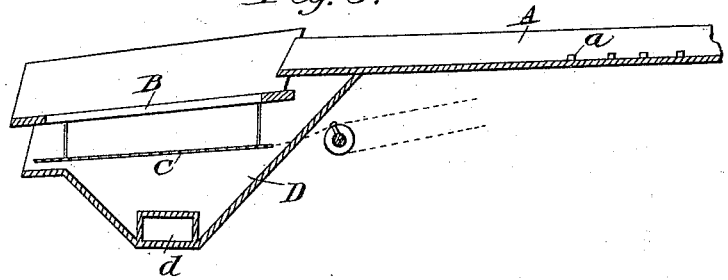
Figure 4:
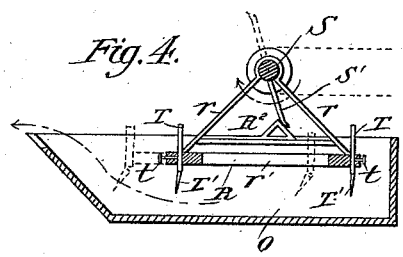
Figure 5:
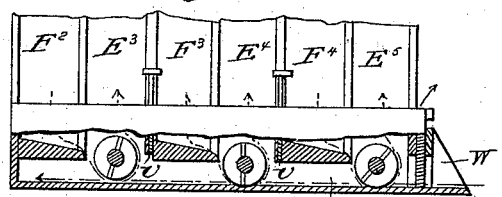
Figure 6:
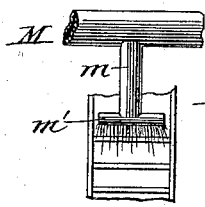

Figure 1 is a plan view of a machine embodying my invention. Fig. 2 is a view in longitudinal section, parts being shown in elevation. Fig. 3 is a detail view, in longitudinal section, of the delivery-spout, the grate-bars, the screen, and the feed-hopper. Fig. 4 is a detail view, in longitudinal section, of the discharge-tank and its rake mechanism. Fig. 5 is a view in cross-section on line $x\,x$ of Fig. 1, a portion of the overflow-plate at the end of the inclined troughs being broken away for better illustration. Fig. 6 is an enlarged detail view of one of the water-jets and a portion of one of the riffle-troughs.

An inclined spout, A, of suitable construction, and provided, preferably, with the riffles $a$, delivers the auriferous mass to be acted upon onto the inclined grate-bars B, which serve to separate therefrom stone and lumps of a size too large to pass into the machine, allowing the remainder of the mass to fall onto the shaking-screen C, which in turn separates and delivers onto a suitable table gravel and like coarse portions of the mass.

Beneath the screen C is placed the feed-hopper D, from which extends the spout $d$, that leads into the lower end of the outer one of the series of conveyer-troughs E, E′, and E² on one side of the machine. Between these conveyer-troughs E, E′, and E², and separated therefrom by partition-walls $e$ and $e′$, are the riffle-boxes F and F′, which communicate with the troughs E′ and E² through the cut-away spaces $e^2$ at the ends of the walls $e′$. The conveyer-troughs E, E′, and E² and riffle-boxes F and F′ are inclined, as seen in Fig. 2, and at their upper ends communicate with the oppositely-inclined series of conveyer-troughs E³, E⁴, and E⁵ and riffle-boxes F², F³, and F⁴ in the manner shown—that is to say, the conveyer-trough E with the riffle-box F², the conveyer-trough E³ with the riffle-box F, and so on, the last conveyer-trough, E⁵, leading to the amalgamated discharge-chute G, that delivers into the discharge-tank H.

Within each of the conveyer-troughs is journaled a suitable conveyer, K, preferably an Archimedean screw; and the upper ends of the conveyers are provided with miter gear-wheels $k$, that engage with and receive motion from the corresponding miter gear-wheels, $l$, on the drive-shafts L and L′, geared together by the cogs $l′$.

Across the top of the machine extends the main water-pipe M, from which lead the jet-pipes $m$, provided with perforated nozzles $m′$, Fig. 6, that discharge a spray of water into the top of each of the riffle-boxes and of the discharge-spout.

At the bottoms of the series of riffle-boxes and conveyer-troughs at each end of the machine is placed an overflow-tank, O, from the top of which extends a spout, P, preferably composed of an amalgamated sheet-metal plate.

In each of the tanks O is placed a suitable agitator or rake, R, that may be suspended from the drive-shaft S by means of the loops or hangers $r$, that encircle the shaft and connect with the frame of the rake. The frame of the rake R consists, preferably, of main parallel bars connected by suitable cross-bars, $r′$, and in these main bars are fitted the teeth T, that are adjustably held in place by means of the set-screws $t$. The lower portions or points, T′, of these teeth are hinged to the body portion, as seen in Fig. 4, so as to be capable of movement in one direction only, in order that they may operate upon the material as the rakes are moved in outward direction.

Upon the upper side of the rake-frame is placed a cam-block, R², which, as the shaft S revolves, will be struck by the arm S' of this shaft, and will cause the rake to swing forward until the arm has passed the top of the cam. The shaft S at one end of the machine also extends through the discharge-tank H, in which is preferably placed an agitating-rake, R⁴, constructed in all respects similar to the rakes in the overflow-tanks, and receiving motion from the shaft in like manner through the medium of a cam-block on the rake and an arm fixed to the shaft.

At the lower ends of the conveyer-troughs and riffle-boxes is formed a continuous trough, V, and the partition-walls e above this trough are cut away and provided with the gates v, which, when raised, will afford a free passage from the bottoms of all the troughs and boxes to the spout W at the side of the machine, as shown in Fig. 5.

The several shafts by which movement is imparted to the conveyers and the rakes are provided with suitable pulleys, so that they shall move together in unison.

From the foregoing construction the operation of my improved apparatus will be seen to be as follows: As the mass of material screened to the desired degree of fineness by the grate-bars B and sieve C is delivered by the spout d to the trough E it is caught by the first conveyer, and is carried thereby up the inclined trough, being thoroughly agitated in its passage, and passes thence into the upper end of the riffle-box F². Here the mass is struck by the spray of water from the jet-pipe m, and is thereby washed downward over the riffles, the quicksilver in which will serve to catch the particles of gold. The very light sand and refuse will pass over the dam at the base of the riffle-box, while the heavier sand and gold that has escaped the quicksilver in the first riffle-box will pass through the opening e² at the base of the box F² into the conveyer-trough E³, where it will be caught by the conveyer and carried upward into the next riffle-box, and so on through the series of troughs and boxes until the discharge-tank H is reached. It will be noticed that in each of the riffle-boxes the sand or other material under treatment will be subjected to a fresh stream of water, and in each will be exposed to the mercury within the riffles, so that there will be little danger of the material passing from the amalgamated discharge-spout G carrying with it any considerable quantity of free gold. So, also, it will be seen that the light sand and foreign matter will pass from the base of each riffle-box into the overflow-tank O, where, being subjected to constant agitation by the rakes R, the lighter matter will pass over the amalgamated discharge-plates, which will arrest any fine particles of gold, while the heavier sand will be deposited in the bottoms of the tanks. After the sand has passed through the amalgamated discharge spout or trough G into the tank H, the rakes in this tank will keep it agitated in such manner as to cause any light foreign matter to escape with the water into the waste, leaving the sand in pure condition for the market.

By forming the teeth of the rakes with hinged portions in the manner shown, the rakes will exert greater force in their forward than in their backward movement, and will hence at each stroke expel a portion of the water and light foreign matter from the tanks, allowing only the heavy sand to settle at the bottoms.

During the operation of the machine any quicksilver escaping from the riffle-boxes will pass into the trough V at the ends of these boxes, and will there serve to arrest particles of gold. When gold is to be "cleaned up" or removed from the machine, the gates v will be raised and the quicksilver will be brushed from the riffles into the trough V, whence it will be removed through the discharge-door.

My improved apparatus, while particularly well adapted for separating and saving auriferous black sand, will be found also highly advantageous for a variety of analogous metallurgical operations in which amalgamating and concentrating machines are commonly employed. I do not wish, therefore, my invention to be understood as restricted to any particular use, nor to the precise details of construction above set out, which may be varied within wide limits.

Having thus described my invention, what I claim as new, and desire to secure by Letters Patent, is—

1. In a separator, the combination, with an inclined conveyer-trough having a delivery-spout at its lower end and the conveyer therein, of an oppositely-inclined riffle-box, said trough and box being connected together at their upper ends, substantially as described.

2. In a separator, the combination of the two sets of oppositely-inclined troughs, each set being divided into conveyer-troughs and riffle-boxes arranged alternately, and provided, respectively, with conveyers and riffles, substantially as described.

3. In a separator, the combination of the two sets of oppositely-inclined troughs, each set being divided into conveyer-troughs and riffle-boxes arranged alternately, and provided, respectively, with conveyers and riffles, and a series of water-jet pipes at the tops of the riffle-boxes, substantially as described.

4. In a separator, the combination of the oppositely-inclined series of conveyer-troughs and riffle-boxes and an amalgamated discharge-spout, substantially as described.

5. In a separator, the combination, with the oppositely-inclined series of conveyer-troughs and riffle-boxes, of the overflow-tanks at the ends of said boxes, substantially as described.

6. In a separator, the combination, with the oppositely-inclined series of conveyer-troughs and riffle-boxes, of the overflow-tanks at the ends of said boxes, provided with rakes or agitators, substantially as described.

7. In a separator, the combination, with the oppositely-inclined conveyer-troughs and riffle-boxes, of the overflow-tanks at the ends of said boxes and the amalgamated discharge plates or spouts adjoining said overflow-boxes, substantially as described.

8. In a separator, the combination, with the overflow-tank, of the rake or agitator comprising the frame R, and the adjustable teeth T, the lower portions of which are hinged, substantially as described.

9. In a separator, the combination, with a series of inclined conveyer-troughs and riffle-boxes, of partition-plates between said troughs and boxes, provided at their lower ends with gates, substantially as described.

10. In a separator, the combination, with the series of inclined conveyer-troughs and riffle-boxes, of a catch-trough extending across the lower ends of said troughs, and the partition-plates between said troughs and boxes, provided with gates, substantially as described.

DAVID G. WEEMS.

Witnesses:
OTHO F. SHOWMAN,
SYDNEY J. SNOW.